(12) United States Patent
Sokolan et al.

(10) Patent No.: US 8,949,184 B2
(45) Date of Patent: Feb. 3, 2015

(54) DATA COLLECTOR

(75) Inventors: Patrick Sokolan, Redmond, WA (US);
Dennis Doherty, Redmond, WA (US);
Claude Duguay, Kenmore, WA (US);
William Radcliffe, Redmond, WA (US);
Virgil Bourassa, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 12/766,937

(22) Filed: Apr. 26, 2010

(65) Prior Publication Data

US 2011/0264628 A1  Oct. 27, 2011

(51) Int. Cl.
*G06F 17/30* (2006.01)

(52) U.S. Cl.
CPC .... *G06F 17/30011* (2013.01); *G06F 17/30368* (2013.01)
USPC ......................................... 707/634

(58) Field of Classification Search
None
See application file for complete search history.

(56) References Cited

U.S. PATENT DOCUMENTS

| | | | |
|---|---|---|---|
| 6,430,601 B1 * | 8/2002 | Eldridge et al. | 709/206 |
| 6,547,829 B1 * | 4/2003 | Meyerzon et al. | 715/234 |
| 7,076,521 B2 | 7/2006 | Davison | |
| 7,457,809 B2 | 11/2008 | Bennetto et al. | |
| 7,627,613 B1 * | 12/2009 | Dulitz et al. | 1/1 |
| 7,792,827 B2 * | 9/2010 | Amitay et al. | 707/726 |
| 7,836,108 B1 * | 11/2010 | Kupke et al. | 707/826 |
| 7,930,226 B1 * | 4/2011 | Quinn et al. | 705/31 |
| 2004/0143644 A1 | 7/2004 | Berton et al. | |
| 2004/0267726 A1 * | 12/2004 | Beynon et al. | 707/3 |
| 2005/0080781 A1 | 4/2005 | Ryan et al. | |
| 2005/0114771 A1 * | 5/2005 | Piehler et al. | 715/536 |
| 2005/0165778 A1 * | 7/2005 | Obata et al. | 707/5 |
| 2006/0107334 A1 * | 5/2006 | Leone et al. | 726/27 |
| 2006/0212879 A1 * | 9/2006 | Bennetto et al. | 719/328 |
| 2007/0255617 A1 * | 11/2007 | Maurone et al. | 705/14 |
| 2007/0255744 A1 * | 11/2007 | Gideoni et al. | 707/102 |
| 2008/0140630 A1 | 6/2008 | Sato et al. | |
| 2008/0313207 A1 | 12/2008 | Modad et al. | |
| 2009/0125701 A1 * | 5/2009 | Suponau et al. | 711/216 |
| 2009/0235161 A1 * | 9/2009 | Williams et al. | 715/255 |
| 2009/0307257 A1 | 12/2009 | Menon et al. | |

OTHER PUBLICATIONS

"Introducing the Data Collector", Retrieved at <<http://msdn.microsoft.com/en-us/library/bb677248.aspx >>, Nov. 2009, pp. 1.
Larsen, Gregory A., "MS SQL", Retrieved at << http://www.databasejournal.com/features/mssql/article.php/3771871/SQL-Server-2008-Data-Collections-and-the-Management-Data-Warehouse.htm >>, Sep. 29, 2008, pp. 10.

(Continued)

*Primary Examiner* — Bai D. Vu
(74) *Attorney, Agent, or Firm* — Julie Kane Akhter; Danielle Johnston-Holmes; Micky Minhas (57) ABSTRACT

A data collector may monitor a data source and identify updated data, which may be processed and prepared for inclusion into a search database. The data collector may have various handlers that may interact with a data source, which may be a database, web service, file system, collaboration system, or other source, and may store a identifying signature and content signature for each document or item. The signatures may be used to identify new, changed, or deleted items, and a payload may be created containing the updates.

20 Claims, 3 Drawing Sheets

(56) References Cited

OTHER PUBLICATIONS

Lopes, et al., "Automated Social Network Epidemic Data Collector", Retrieved at << http://xldb.fc.ul.pt/xldb/publications/Lopes.etal:AutomatedSocialNetwork:2009_document.pdf >>, INforum—Computing Symposium, Sep. 2009, pp. 10.

"PANGAEA®", Retrieved at << http://www.pangaea.de/about/ >>, Retrieved Date: Feb. 22, 2010, pp. 2.

* cited by examiner

DATA COLLECTOR

BACKGROUND

Search engines typically have a database that represents certain objects that are searchable, those objects may be web pages, database entries, documents, files, or other items, depending on the search engine. Collecting those objects using crawling techniques can place burdens on a data source, such as a database, web service, or other source and may not be thorough and complete.

SUMMARY

A data collector may monitor a data source and identify updated data, which may be processed and prepared for inclusion into a search database. The data collector may have various handlers that may interact with a data source, which may be a database, web service, file system, collaboration system, or other source, and may store a identifying signature and content signature for each document or item. The signatures may be used to identify new, changed, or deleted items, and a payload may be created containing the updates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A data collection service may contain several data handlers that may have read access to a data source. The handlers may be capable of reading data from a data source and preserving various metadata, which may include permission or access settings for the data. The data may be in the form of documents, which may be a database entry, web page, word processing or spreadsheet document, or other unit of data.

A signature may be created for a document identifier as well as the document contents. The signatures may be created by using a hash function that may generate a unique identifier for the document as well as the document contents.

The signatures may be stored in a database and used to determine when a document has been added, modified, or deleted. In some embodiments, a handler may monitor a change log or use other mechanisms to determine when a document has been added, modified, or deleted. The data collection service may create payloads that may be processed by a search engine, and those payloads may be tagged as new, modified, or deleted to aid the search engine in processing the documents.

The data handlers may be located very close to the data sources. For example, a website may have a built-in data handler that may monitor changes on the website and create updates based on changes identified by the data source.

Throughout this specification and claims, the term "document" is used to denote the atomic unit that is stored and manipulated by the various systems. The "document" may be a word processing document, spreadsheet document, or other similar file. In some cases, the "document" may be a database record, web page, email message, or any other unit. The "document" may be text based or may include audio, video, or other types of data which may be classified, tagged, searched, or otherwise manipulated.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
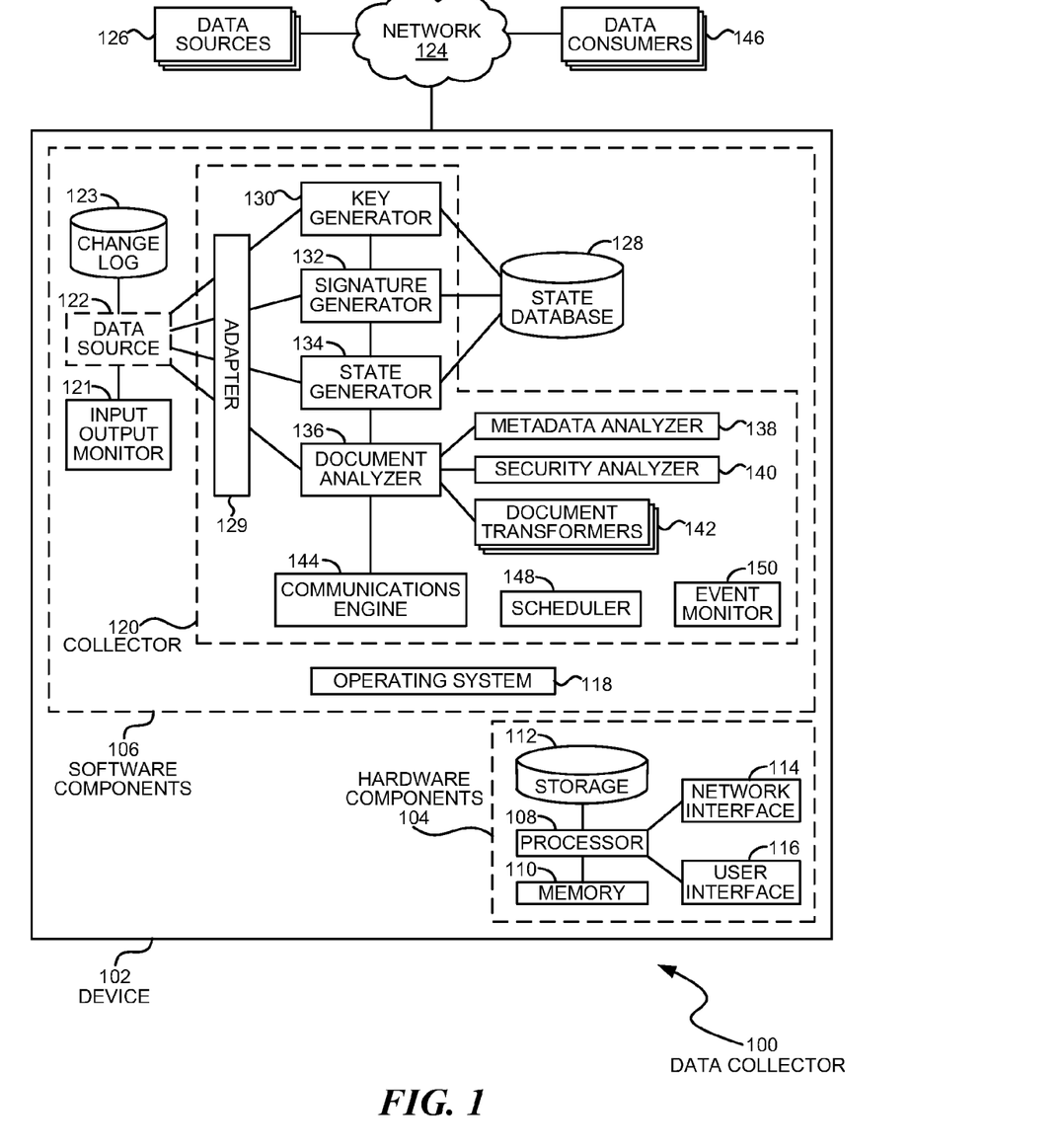
FIG. 1 is a diagram illustration of an embodiment showing a system with a data collector.

FIG. 1 is a diagram of an embodiment 100, showing a data collector that may be used to collect data from a data source. Embodiment 100 is a simplified example of a device in which a collector may operate and the functions a collector may have.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a data collector that may collect documents from a data source and transmit packages to a data consumer, where the packages may contain new or changed documents, or may include a package for a deleted document.

The data collector may reside close to a data source and may transmit only changed documents to a data consumer. The data consumer may receive only the information that is updated or changed, thereby reduce the processing effort that may be performed by a data consumer.

The data collector may differ from web crawlers that may be used to collect data for various data consumers, such as search engines. A web crawler may return all the documents to a data consumer for the data consumer to process and determine which documents have changed or are newly added. Deleted documents may be inferred when a web crawler fails to return the document. With a web crawler, the data consumer may have to process each document, many of which may be unchanged.

The data collector may be partially integrated into a data source in some embodiments. For example, a data collector may be configured to read a change log created by a data source or to monitor the input or output of the data source in order to identify changed documents. The integration may allow the data collector to identify changes without having to perform a query on each document or to traverse the dataset to identify changes.

Embodiments with integrated data collectors may allow the data collector to operate with a minimum of additional processing on the part of the data source. Many data collectors may operate by only processing changed documents, including new or deleted documents, and may rely on the data source to indicate which documents have changed. Such a configuration may minimize any load on the data source.

Different data collectors may be customized or adapted to interface with specific types of data sources. A generic data collector may have an adapter that may enable a simple, customized interface to a data source. In many embodiments, the adapter may be a set of queries that are customized to access a specific data source.

A data collector may collect data for many different types of data consumers. In one use scenario, a set of data collectors may be used to collect documents from various sources for an enterprise search engine. In such a use scenario, an enterprise or company may have many different types of data sources, such as databases, file system, messaging systems, and other data sources. Each data source may be outfitted with a data collector and may collect updates and transmit the updates to the enterprise search engine.

In another use scenario, a web service may install a data collector on a web server to provide updated and current information to an Internet search engine. In such an embodiment, the data collector may reduce the workload on the Internet search engine and may provide more timely updates than a conventional web crawler.

For example, an Internet commerce site or Internet auction site may have many thousands of items for sale, each of which may have continually changing data. Such sites may maintain a database that contains information that a web service may use to build a web page when the web page is requested by a user. Many embodiments also customize a requested web page for a specific user. For example, an auction site may provide a user's current bid status on a web page or a commerce site may provide a user's recent purchases.

Such websites may be very difficult or impossible to traverse using conventional web crawling technology. In many cases, a commerce site or auction site may create static web pages that are available for web crawlers but may not be generally accessed by users.

A data collector may be used in such websites to create new or updated documents representing the web pages, and to provide the documents to an Internet search engine or other data consumer in a timely fashion with less overhead or processing on the part of both the data provider and the data consumer.

A data collector may allow a data provider to control what types of information may be provided to a data collector and to format the data in a manner useful to the data consumer. In many cases, a data collector may be able to tag documents and generate metadata about the documents that may be useful to a data collector. Similarly, the data collector may be able to remove certain data or use placeholders instead of actual content.

A data collector may be capable of re-formatting a document from a data source and creating a document in a format useful to a data consumer. For example, a data source may provide a Portable Document Format (PDF) document. The data collector may perform an Optical Character Recognition (OCR) process on the document to convert an image to text. The text may be provided to a search engine, for example, and the search engine may index the document based on the text.

A data collector may be capable of removing portions of the document that may not be useful to a data consumer. For example, a web service may provide a web page with context-sensitive advertising. The data collector may be capable of removing the advertising from the web page, as the advertising may not be useful to the data consumer.

Some embodiments may remove data and replace that data with a tag or placeholder. In the example above where advertising was removed from a web page, the advertising may be removed and replaced with a placeholder for context sensitive advertising. The placeholder may be a link to a service that provides context-sensitive advertising so that a user who views the document through the data consumer may be provided with up to date context sensitive advertising.

Security aspects of a document may be facilitated with a data collector. In embodiments where documents may contain classified or sensitive information, a data collector may preserve the security by using a Digital Rights Management (DRM) system to control the use of or access to the document when the document is transferred to a data consumer. In some embodiments, documents with access restrictions may be tagged as having restricted access and a data consumer may be configured to process the document in a restricted or access controlled manner.

In some embodiments, the data collector may be capable of identifying elements or items within a document that are sensitive. For example, a database may contain personally identifiable information that may have access restrictions, but may also contain other information that may not have access restrictions. In such an embodiment, a data collector may receive a database record to treat as a document. Within the database record, the sensitive fields may be marked as sensitive or access controlled but the other fields may be unmarked. The data consumer may manage the access properties of the document and may restrict access to the sensitive information to those users who have the appropriate credentials.

Embodiment 100 illustrates an example of a device 102 that may have a data collector function. The architecture of embodiment 100 illustrates a data collector that may function on a single device, such as a server computer. In some embodiments, such as large scale web services or databases that may be found in large datacenters, the functions of a data collector may be performed by several processes that may reside on several hardware platforms.

The architecture of device 102 may be that of a conventional server or desktop computer, with a set of hardware components 104 and software components 106. Embodiments may be deployed on many different hardware platforms. The hardware platforms may be large servers that may be virtualized in some cases, desktop computers, laptop and netbook computers, game consoles, and other platforms. In some cases, the hardware platforms may be small, portable devices such as portable music players, personal digital assistants, or mobile telephones.

One example may be a data collector that may operate on a cellular telephone to monitor and collect contact lists, instant messages, photographs, or other information or data available on the telephone. Such an embodiment may collect documents representing the data and upload the data to a cloud based backup system, for example.

The hardware components 104 may include a processor 108, random access memory 110 and nonvolatile storage 112. The hardware components 104 may also include a network interface 114 and a user interface 116.

The software components 106 may include an operating system 118 on which various applications may operate, including the collector 120.

The device 102 illustrates an example where the collector 120 may operate on the same hardware platform as a data source 122. Such an architecture may be useful in embodiments where the data source 122 may be contained on a single device. In other architectures, the data source 122 may be provided by a cluster of devices or on another device where the collector 120 cannot efficiently operate. In such an architecture, the collector 120 may be executed on one hardware platform and the data source 122 may be provided by another hardware platform or set of hardware platforms. For example, the collector 120 may access data sources 126 through a network 124.

The collector 120 may have one or more components execute on different hardware platforms. In such embodiments, the functions of the collector 120 that are illustrated in embodiment 100 may be performed by different devices.

The collector 120 may manage a state database 128 that may store a state of documents in the data source 122. A key generator 130 may receive a document and create a database key for the document, and the signature generator 132 may generate a content signature. The database key and content signature may be compared to that stored in the state database 128 to determine if a document has changed since the last scan.

The key generator 130 may receive a Uniform Resource Identifier (URI) for the document and may perform a hash function on the URI to create a document key. Similarly, the signature generator 132 may perform a hash function on the content of the document to create a document signature. In some embodiments, the hash function may be a hash function with limited or no collisions. One such hash function may be MD5.

A state generator 134 may determine whether or not a document has changed by comparing the signature calculated by the signature generator 132 and the signature stored in the state database 128. In some embodiments, the state generator 134 may perform such an analysis in response to a failed scan of the data source 122. In such a case, the state generator 134 may analyze and update the state database to reconcile any changes that may have been lost due to an incomplete scan of the data source 122.

A document analyzer 136 may analyze the metadata, security, and content of a document to prepare the document for consumption by a data consumer 146.

A metadata analyzer 138 may analyze any metadata associated with the document. In many embodiments, the metadata analyzer 138 may define how the document may be prepared for a data consumer. For example, the metadata analyzer 138 may cause various transformations to be applied to the document, such as reformatting or translating the document. In some embodiments, the metadata analyzer 138 may use metadata associated with the document to generate tags or additional metadata that may be consumed by the data consumer.

A security analyzer 140 may operate on any security settings associated with a document. In some cases, the security analyzer 140 may identify specific portions of a document that are classified and have access or use restrictions. In such a case, the security analyzer 140 may tag the classified portions of the document with any access or use restrictions. In other cases, the security analyzer 140 may identify access or use restrictions that may apply to the entire document. The security analyzer 140 may associate a document with a Digital Rights Management (DRM) system in some cases.

Various document transformers 142 may process a document to add more information to the document, remove information from a document, or change the document in some manner. Some embodiments may, for example, add metadata to a document that may include a timestamp for when the document was processed and where the document originated.

In some cases, a document transformer 142 may analyze the document contents to identify certain items and embed tags within the document so that a data consumer may process the items in a special manner. For example, a document transformer may scan a document to identify a user's name, where the user may be a person for whom an entry may be maintained in a data source's database. The user may be flagged so that a search may be performed against the user name, for example.

A document transformer 142 may scan a document for specific content that may be removed from the document. For example, a database may provide records that include financial information for various companies. The document transformer 142 may scan the document to identify the sensitive information, such as the company names, and may remove or redact the company names from the document.

A document transformer 142 may modify a document. For example, a document may be scanned using Optical Character Recognition to convert an image to text, or a spreadsheet document may be translated from one spreadsheet format to another.

A communications engine 144 may create packages to transmit updates to a data consumer. In some embodiments, each individual document may be transmitted in a single package. In other embodiments, a package may contain two or more documents. In some such embodiments, a package may contain all of the changes detected in one scan of the data source.

The collector 120 may be implemented in a modular fashion. An adapter 129 may comprise a customization for the data source 122. The adapter 129 may contain scripts, executables, parameters, or other information that may enable the various components of the collector 120 to communicate with the data source 122. In a modular implementation, many of the components such as the key generator 130, signature generator 132 and others may be generic components that may be used for many different types or different instances of a data source 122. The adapter 129 may include customizations that may enable the generic components to communicate with specific data sources.

The collector 120 may have a scheduler 148 or event monitor 150 that may cause the collector 120 to begin execution. A scheduler 148 may cause the collector 120 to execute at a predetermined date and time, while the event monitor 150 may cause the collector 120 to execute when a predetermined condition or set of conditions may be met.

A controller 120 may monitor a data source 122 using several different mechanisms. In one mechanism, the controller 120 may be launched periodically and may scan all of the contents of the data source 122. Such a scan may compare the current state of a document with the state stored in the state database 128. Those documents that have changed since the last scan may be processed.

In another mechanism, the controller 120 may have an input or output monitor 121 that may monitor incoming and outgoing traffic to the data source 122. The monitor 121 may identify changed documents within the data source 122 and may cause those documents to be processed by the collector 120.

In still another mechanism, the controller 120 may periodically read a change log 123 that may be kept by the data source 122. The change log 123 may include changes made to documents within the data source 122. The controller 120 may scan the change log 123 to identify changed documents and may process those documents.

The collector 120 may transmit documents to one or more data consumers 146. The data consumers 146 may be any application, database, or system that may receive the transmission packages produced by the collector 120. An example data consumer 146 may be a search engine, a data backup system, or other applications or systems.

Figure 2:
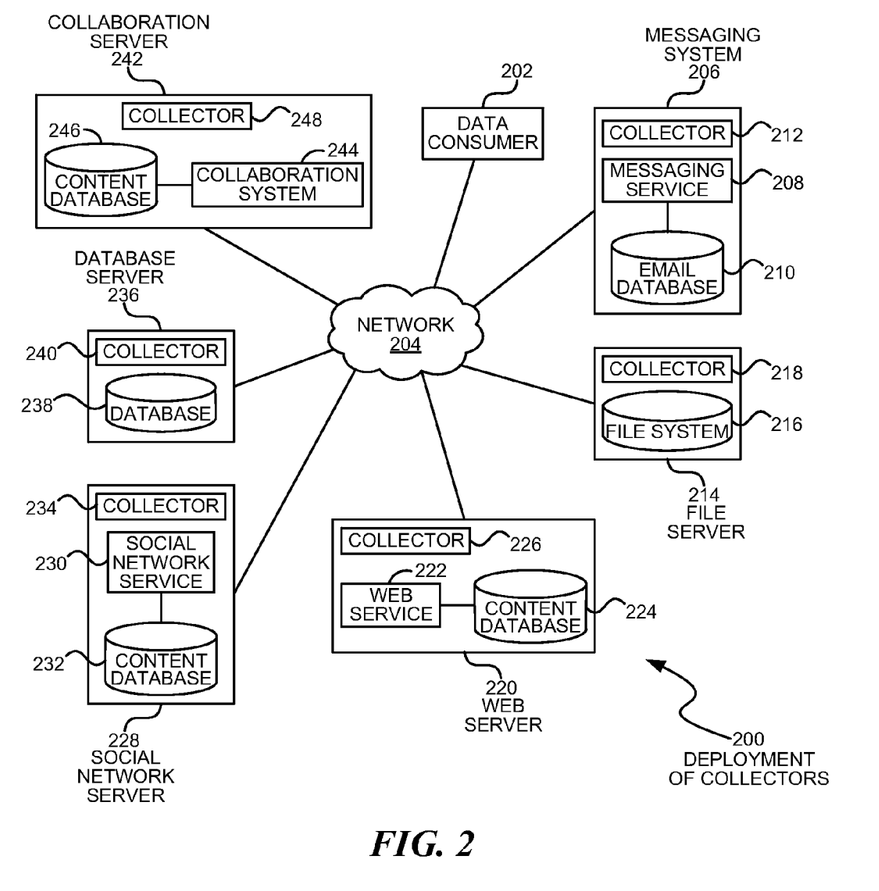
FIG. 2 is a diagram illustration of an example embodiment showing example deployments for data collectors.

FIG. 2 is a diagram illustration of an example embodiment 200 showing various deployments of collectors. Embodiment 200 is an example of various systems in which a collector may be used.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 may be an example of an enterprise search system that may collect information from many different sources, categorize the information, and make the information available through a search system. In an enterprise search system, some information may be sensitive and have restricted access to certain people within the organization.

A data consumer 202 may be a search system that may receive documents to classify, index, and search in the example. In other embodiments, the data consumer 202 may be any application or system that may receive and use the documents provided through one or more of the various collectors. A network may connect the data consumer 202 to various collectors.

One example use of a collector may be at a messaging system 206. A messaging system 206 may process email messages, instant messages, or other messages. In many cases, a messaging service 208 may have a database 210 that may contain mailboxes in which email messages may be stored. A collector 212 may operate in conjunction with the messaging service 208 to gather, classify, and transmit documents that may represent email messages or other communications.

Another example may be on a file server 214. A file server 214 may contain a file system 216 and a collector 218 may monitor the file system 216 for changes and update the data consumer 202 when a change occurs.

A web server 220 may have a web service 222 that may serve web pages to various clients. The web service 222 may have both static and dynamic pages. A static page may be a web page that may be pre-defined. A dynamic web page may be one that may be created in whole or in part from a content database 224. A collector 226 may analyze the web pages as documents and prepare and transmit the web pages to the data consumer 202.

A social network server 228 may host a social network service 230 that may contain content stored in a content database 232. In many manners, a social network service may operate in a similar manner as a web service 222. However, a social network service may include many different forms of content, such as text, audio, video, and other document types. In many cases, social networks may be implemented as web services. The collector 234 may collect and process the various content forms into a format that may be consumed by a data consumer 202.

A database server 236 may contain a database 238 that may be queried by users or applications. A database record, report, or other content may be treated as a document and may be collected and processed by the data consumer 202. In many embodiments, the database 238 may have change logs or other mechanisms that may be used by a collector 240 to identify updates or changes to the database 238.

A collaboration server 242 may have a collaboration system 244 that may be used for sharing documents, data, calendars, messages, and other information. A content database 246 may contain the various data that may be accessed by the collaboration system 244. A collector 248 may reside on the collaboration server 242 and may collect various documents, prepare the documents, and transmit the documents to a data consumer 242.

The various examples in embodiment 200 reflect different types of collectors and different applications for collectors. The examples of embodiment 200 are meant to illustrate different use scenarios for a collector.

Figure 3:
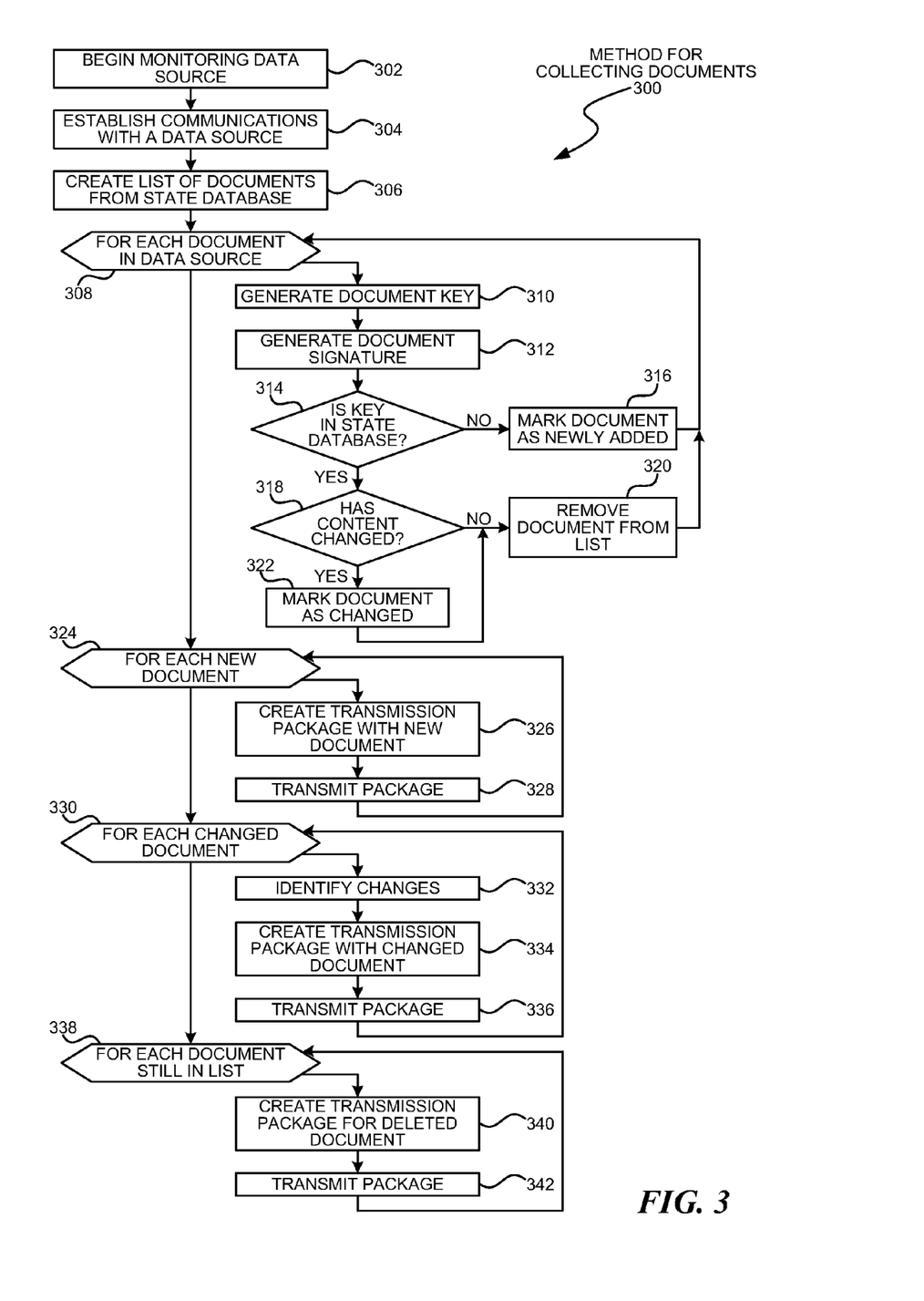
FIG. 3 is a flowchart illustration of an embodiment showing a method that may be performed by a data collector.

FIG. 3 is a flowchart illustration of an embodiment 300 showing a method for collecting documents. Embodiment 300 is an example of a method that may be performed by a collector, such as collector 120 described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method whereby a document collector may gather all of the documents from a data source and compare the current state of the documents to a previously stored state. In other embodiments, a document collector may analyze a change log or communications log to identify changed documents.

Monitoring a data source may begin in block 302. In some embodiments, a scheduler or other mechanism may cause a monitoring operation to begin. For example, a monitoring operation may begin after business hours when the workload on a document source may be minimal.

Communications may be established with the data source in block 304 and a list of documents may be obtained from the state database in block 306. The list of documents from the state database may contain all of the documents that were previously processed by the document collector.

The list of documents may be used to identify items deleted from the database. As each item is processed from the database, existing items may be removed from the list, and those items remaining on the list after processing all of the documents may be those items that are deleted.

Each document may be examined in block 308. For each document in block 308, a document key may be generated in block 310. The document key may be used as an index in a state database. One mechanism for generating a document key may be to perform a hash function on a URI for the document. The hash function result may be used as the document key.

In block 312, a document signature may be generated. The document signature may be a checksum, hash value, or other mechanism that may be used to compare document states.

If the document key is not in the state database in block 314, the document may be marked as newly added in block 316.

If the document key is in the state database in block 314 and the content has not changed in block 318, the document may be removed from the list in block 320. Documents that have not changed may be ignored by the document collector.

If the document has changed in block 318, the document may be marked as changed in block 322.

For each new document in block 324, a transmission package may be created in block 326 with the new document. The transmission package may include the new document as well as metadata about the document source, the document URI, and other metadata that may be generated by the document collector. The transmission package may be transmitted in block 328.

For each changed document in block 330, the changes may be identified in block 332. A transmission package may be created in block 334 with the changed document and any identified changes. In some embodiments, a document consumer may process changed documents in a different manner than new documents. Some such embodiments may use the identified changes to update just the changed portion of the document without re-processing the entire document. The transmission package may be transmitted in block 336.

For each document still in the list in block 338, a transmission package may be generated in block 340 for the deleted document. Such a transmission package may identify the document and include a notification that the document is deleted. The package may be transmitted in block 342.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
    a processor;
    a data source monitor operating on said processor that communicates with a data source to retrieve documents within said data source;
    a state generator that stores a first state for each of said documents;
    a key generator that identifies a Uniform Resource Identifier for each of said documents and generates a hash of each of said Uniform Resource Identifiers to create a document identifier for each of said documents;
    a signature generator that generates a signature for each of said documents;
    a database comprising said first state and said document identifier for each of said documents;
    a document analyzer that:
        identifies a first document from said documents as being a changed document; and
        analyzes said first document to identify one or more types of content within said first document; and
    a communications engine that:
        creates a transmission package comprising at least one of the one or more types of said content and said document identifier for said document in response to said first document being analyzed to identify the one or more types of said content within said first document; and
        transmits said transmission package to a data consumer.

2. The system of claim 1, said data source being comprised in said system.

3. The system of claim 1, said data source being a database.

4. The system of claim 3, said data source monitor that further:
    generates a query to said database; and receives a response from said database, said response comprising said documents.

5. The system of claim 4, said data source being a web service comprising said database.

6. The system of claim 1, said data source being a file system.

7. The system of claim 1, said data source monitor that further:
monitors a change log from said data source;
identifies a changed document from said change log; and
retrieves said changed document from said data source based on said change log.

8. The system of claim 1, said document analyzer that further:
identifies a document type for said first document;
selects a filter based on said document type; and
identifies said one or more types of content using said filter.

9. The system of claim 8, said document analyzer that further:
performs an optical character recognition on at least a portion of said first document.

10. The system of claim 1, said document analyzer that further:
determines an access control parameter for said first document, said access control parameter being included in said transmission package.

11. The system of claim 1, said hash being MD5.

12. The system of claim 1 further comprising:
a scheduler that launches said data source monitor at a predetermined time.

13. The system of claim 1 further comprising:
an event monitor that launches said data source monitor at a predetermined condition.

14. A method performed on a computer processor, said method comprising:
monitoring a data source comprising a collection of documents;
determining a first collection state comprising a state for each of said documents;
storing said first collection state in a state database;
for each of said documents:
identifying a document identifier from a Uniform Resource Identifier;
generating a document state from said document;
looking up said document identifier and said document state in said state database to identify changed documents from said documents;
for each of said changed documents:
identifying one or more types of content within said changed document;
creating a transmission package comprising at least one of the one or more types of said content and said document identifier for said changed document in response to identifying the one or more types of said content within said changed document; and
transmitting said transmission package to a data consumer.

15. The method of claim 14 further comprising:
said monitoring comprising scanning a change log from said document source.

16. The method of claim 14 further comprising:
identifying a first document comprising a link to a second document; and
retrieving said second document and adding contents from said second document to contents of said first document.

17. A system comprising:
a processor;
a data source monitor operating on said processor that communicates with a data source to retrieve documents within said data source, said data source comprising a collection of documents;
a key generator that identifies a Uniform Resource Identifier for each of said documents and generates a hash of each of said Uniform Resource Identifiers to create a document identifier for each of said documents;
a state database comprising a state and said document identifier for each of said documents, and further comprising a collection state;
a state generator that:
determines a first state for each of said documents to create a state collection, said first state comprising a signature; and
stores said state collection in said state database;
a document analyzer that:
receives a set of changed documents from said documents; and
for each of said changed documents in said set of changed documents, analyzes said changed document to identify one or more types of content within said changed document; and
a communications engine that:
creates a transmission package comprising at least one of the one or more types of said content and said document identifier for each of said changed documents in response to said changed document being analyzed to identify the one or more types of said content within said changed document; and
transmits said transmission package to a data consumer.

18. The system of claim 17, said data source being a database.

19. The system of claim 18, said data source being a web service comprising a database.

20. The system of claim 19, said data source being a collaboration environment.

* * * * *